United States Patent [19]
Elliott et al.

[11] Patent Number: 5,217,789
[45] Date of Patent: Jun. 8, 1993

[54] REFRACTORY SUPPORTS

[75] Inventors: Gary K. Elliott; Robert Chadwick; Henry R. Meumann, all of Staffordshire, England

[73] Assignee: Foseco International Limited, Birmingham, England

[21] Appl. No.: 497,008

[22] Filed: Mar. 21, 1990

[30] Foreign Application Priority Data

Mar. 28, 1989 [GB] United Kingdom ............... 8906916

[51] Int. Cl.$^5$ .................................................. B32B 9/00
[52] U.S. Cl. ................................... 428/192; 428/288; 428/296; 428/323; 428/328; 428/446; 428/412; 264/42
[58] Field of Search .............. 428/288, 296, 412.4, 428/323, 328, 446, 192; 264/42

[56] References Cited

U.S. PATENT DOCUMENTS

| | | | |
|---|---|---|---|
| 4,650,775 | 3/1987 | Hill | 428/296 |
| 4,751,205 | 6/1988 | Hill et al. | 428/288 |
| 4,812,424 | 3/1989 | Helferich et al. | 428/312.4 |
| 4,814,300 | 3/1989 | Helferich | 428/312.4 |
| 4,963,515 | 10/1990 | Helferich | 264/42 |

FOREIGN PATENT DOCUMENTS

| | | |
|---|---|---|
| 077444 | 4/1983 | European Pat. Off. . |
| 260867 | 3/1988 | European Pat. Off. . |
| 0395203 | 10/1990 | European Pat. Off. . |
| 3230253 | 2/1984 | Fed. Rep. of Germany . |
| 2337704 | 9/1977 | France . |
| 59-88378 | 5/1984 | Japan . |
| 60-215582 | 10/1985 | Japan . |
| 1264022 | 2/1972 | United Kingdom . |
| 1402318 | 8/1975 | United Kingdom . |
| 1576312 | 10/1980 | United Kingdom . |
| 2093009 | 9/1984 | United Kingdom . |
| 2093010 | 9/1984 | United Kingdom . |
| 2168284A | 6/1986 | United Kingdom . |

*Primary Examiner*—Patrick J. Ryan
*Assistant Examiner*—W. Krynski
*Attorney, Agent, or Firm*—Nixon & Vanderhye

[57] ABSTRACT

An improved refractory support (kiln furniture) and a method of manufacture. The composition of the refractory support reduces the likelihood that it will adhere to the article which it is supporting during manufacturing. The kiln furniture is formed from bound ceramic fibers of aluminosilicate and alumina with a ground particulate filler of aluminosilicate and alumina, and refractory reactive binder of alumina and silica in a colloidal form.

21 Claims, 1 Drawing Sheet

REFRACTORY SUPPORTS

FIELD OF THE INVENTION

This invention relates to refractory supports, e.g. kiln furniture used in the manufacture of ceramic articles, e.g. vitreous ware.

BACKGROUND OF THE INVENTION

During manufacture ceramic articles are fired at high temperatures and vitreous ware, for example, may be fired at temperatures in the range of 1000° C. to 1450° C. During the firing operation it is necessary to provide a support or supports for the articles and different types of known supports include refractory setters, batts, props and saggars. A setter for example is used to support and protect the shape of the ware from deformation and sagging as it passes through its vitreous, plastic stage during the heat treatment.

Conventionally, setters and other kiln furniture have been made from refractory materials such as cordierite—a magnesium, aluminium and silicate material—(for temperatures up to about 1260° C.) and silicon carbide (for temperatures higher than 1260° C.). These materials are relatively dense and have high thermal mass. Therefore the firing cycle for the desired ceramic products may be governed more by the properties of the supports than those of the precursers of the desired products.

More recent proposals have attempted to overcome this problem by the incorporation of ceramic fibers into the compositions from which the refractory supports are made, the use of the fibers with a suitable binder and filler material enabling the density of the products to be reduced while also giving an improvement in thermal mass properties.

However, these proposals have not been entirely satisfactory in practice and a need still remains for a light, low thermal mass product that can be used as a refractory support without causing problems such as "plucking". Plucking is a well-known phenomenon in this field and is caused by adhesion between the ceramic article being fired and its refractory support. Removal of the article from the support results in portions of the support being detached and sticking to the article, causing defects and rejects. In order to avoid this problem it has been found necessary to apply a surface coating of e.g. zircon or alumina, over the refractory support.

We have now found that this problem of plucking can be avoided, whilst retaining the low density and thermal mass of the desired support, and maintaining the required strength of the support, by a particular combination of binders in the composition and that the need for a provision of a final separate surface coating step can be eliminated.

SUMMARY OF THE INVENTION

Accordingly, the invention provides in one aspect a refractory support for a ceramic article while it is being fired, the support being a formed and fired mass to give the required support to the ceramic article and comprising bound ceramic fibres of alumino-silicate and alumina with a refractory ground particulate filler and a refractory reactive binder, the binder containing alumina and silica both of colloidal particle size.

The refractory ground particulate filler is a particulate material that has been formed by mechanical diminution, i.e. grinding or like process, and can be typically of a size such that at least 90% of the particles are from 10 to 100 microns diameter.

The refractory reactive binder material is of much smaller size and will normally be made by a chemical process as opposed to mechanical diminution. For example, the particle size of the silica is preferably from 1 to 150 nanometers, especially from 7 to 30 nanometers. The particle size of the alumina is preferably from 1 to 250 nanometers, especially from 20 to 200 nanometers. Thus the reactive binder materials are preferably provided in colloidal sol form but other particulate forms may be suitable provided that they can be obtained in sufficiently small particle size.

Although not wishing to be limited to any particular theory, it is believed that the reactive binder materials react together during firing of the product to form a stable compound such as mullite. The relative proportions of the binders are, therefore, preferably chosen to bind as much of the reactive silica as possible as it is believed that 'free' reactive silica is a prime cause of the 'plucking' problem referred to above. Ideally, for mullite formation, about 72 parts by weight of alumina to 28 parts by weight of silica are required but proportions outside this ratio can give products that are both adequately strong and 'pluck'-free. Clearly, therefore, there should not be a preponderance of silica to alumina and so the proportions may vary from, say, 50:50 to 90:10 by weight of alumina to silica. Preferably the proportions should be from 60:40 to 85:15 by weight of the reactive alumina binder to the reactive silica binder.

The reactive binder may, for example, be present in an amount of from 1 to 45% by weight of the fired product, preferably from 20% to 30%.

The ceramic fibres may, for example, be present in an amount of from 50% to 80% by weight of the fired product.

The alumina fibres may be so-called 'high alumina' fibres, i.e. of more than about 60% alumina content.

Where the fibres used are aluminosilicate fibres, they may optionally contain up to 20% by weight of zirconia. Also the aluminosilicate fibres may be blended with up to 50% by weight of high alumina fibres.

The presence of high alumina fibres increases the temperature resistance of the product. Thus for the firing of vitreous hotelware and bone china, which require firing temperatures of from about 1150° to 1250° C., it may not be necessary to include high alumina fibres in the support. However, for the firing of porcelain a temperature of over 1400° C. is required and the presence of high alumina fibres in the support may be necessary.

The particulate refractory filler may, for example, be present in an amount of up to 49%, preferably 5% to 30%, by weight of the fired product. It preferably is of a size no more than about 75 microns.

The refractory particulate filler is preferably alumina but may be, for example, zircon, zirconium oxide, silicon carbide, silicon nitride, aluminosilicates, fused silica or boron nitride.

The refractory fillers not only act as densifiers but also contribute to strength and refractoriness.

Other ingredients, e.g. clay binders, may optionally be included.

Products of the invention have the desired excellent density and thermal mass properties of fibre-containing products but additionally do not cause plucking problems and have excellent strength.

In another aspect of the invention a refractory support is made by forming an aqueous slurry of aluminosilicate and alumina fibres with a reactive binder containing both silica and alumina of colloidal particle size and a ground refractory particulate filler, forming the slurry to a preform shape, pressing the preform to the final required form and then firing the product.

The preform shape is preferably made by vacuum-forming the slurry but other means, e.g. injection-forming may be used.

The slurry may contain a proportion of high alumina fibres and other optional ingredients as detailed above and it is preferred to add a flocculating agent prior to the forming stage. This may be any conventionally used organic agent, e.g. cationic starch, or cationic or anionic polyacrylamide.

The solids content of the slurry prior to the forming stage, may be up to 50% by weight, preferably up to 10% by weight, e.g. 2% to 5% being the especially preferred range.

After the forming stage the solids content of the preform may have increased, for example, to about 30% to 80% by weight so that it will be appreciated that, although handleable, it still contains a high proportion of water.

If desired, a combined two-part tool may be used for the vacuum-forming and pressing stages. Thus the upper part of the tool may comprise the former for the preform and have appropriate ports for application of vacuum and egress of water and the lower part will form the required seal. After vacuum-forming the lower part is removed and the preform still in the upper part is placed in a press and is pressed to the desired final form using a suitably-shaped non-dewatering tool. Alternatively, the vacuum-forming and pressing operations can be carried out using quite separate tools, in which case of course it will be necessary for the final press tool to allow for egress of water.

The pressing operation may be carried out at relatively low pressures, e.g. from 50 to 200 p.s.i.g. In addition to producing the final shape, the pressing operation compacts and densifies the product.

The pressed support is stripped from the press and then dried prior to firing. For example, it may be air-dried in an oven at about 120°-180° C.

Typical firing temperatures may be in the range 800° C. to 1400° C.

The shape of the preform will of course be determined by the final precise shape required from the pressing stage. Thus a flat, disc-like preform may be suitable if the final form is not too greatly angled or dished from the flat form. However, if a considerable amount of dishing or other shape change is required then a flat preform may prove to be unsuitable as it could tear or crack in the subsequent forming. Hence the preform may need to have at least partial dishing, for example, to achieve a fully dished final product. The actual amount of shaping of the preform that will be required for any particular final shape will be readily determinable by the average skilled man of the art.

The invention is especially applicable to the provision of improved setters for vitreous ware and will for convenience be more particularly described with reference to that embodiment.

It will be appreciated that each piece of vitreous ware to be fired may require its own specially-shaped setter to give it the required support during its vitreous phase. The means of designing an individual setter for a specific piece of ware is well known in the art. Thus the vitreous ware manufacturer must carry large stocks of specific setters and this is compounded by the fact that conventional setters are susceptible to shock fracture in rapid firing cycles and hence have a very short working life cycle in such conditions. Setters according to the present invention can be made to the same existing geometrical design requirements but have much greater life expectancy in rapid firing conditions. Moreover, because of their greatly improved thermal mass characteristics, more rapid and efficient firing cycles are achievable. The products of the invention are also considerably less dense than conventional products, e.g. being typically 0.2 to 1.2 g/cc compared with 2.0 to 2.3 g/cc for cordierite and greater than 2.5 g/cc for silicon carbide.

Setters of the invention are light and robust and eminently suitable for stacking for firing, transport and storage purposes. They can be formed with a depending annular flange specifically for that purpose.

EXAMPLE

A setter for a 15 cm bone china plate was made by forming an aqueous slurry of the following ingredients.

|  | Parts by weight |
| --- | --- |
| Alumina silicate fibre | 37.9 |
| colloidal silica 30% w/w dispersion in water | 14.7 |
| colloidal alumina 30% w/w dispersion in water | 37.9 |
| particulate alumina | 9.5 |

The slurry was made to have a solids content of 2% based on the fibre weight, i.e. for each kilo of fibre, 50 liters of water was used.

The slurry was agitated to maintain solids suspension and sufficient flocculent was added while continuing agitation until the liquid became clear.

The flocculated slurry so obtained was run off into a forming tank containing a forming tool of the required dimensions of the preform. Vacuum of 22 inches Hg pressure was applied and the preform shape obtained, which contained about 60% of water.

The preform was then press moulded at 100 p.s.i.g. (6.8 bar). The resulting setter was fired at 1300° C. and was then found to be a highly satisfactory product having a density of 0.8 g/cc.

BRIEF DESCRIPTION OF THE DRAWINGS

The invention is illustrated by way of example only in the accompanying drawings in which:

In FIG. 1, a setter 10 of the composition of the invention has a generally disc-shaped body 11 and a depending annular flange 12.

In FIG. 2 a mould 13 comprises an upper tool 14 and a lower tool 15. Tool 14 has a port 16 for application of vacuum and a perforated lower surface 17 of circular plan form through which water may be egressed. Lower surface 17 is stepped around its edge, the step 18 corresponding to a desired depending flange of the eventual product. A slurry 19 of the desired composition is fed in through ports 20 and 21 of the lower tool 15 to fill the mould cavity that is defined between the tools.

Application of vacuum through port 16 then sucks water through the perforated surface 17, leaving the desired pre-form.

Figure 1:
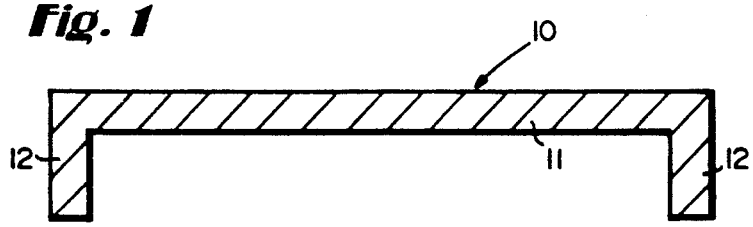
FIG. 1 is a cross-section through a setter of the invention.
Figure 2:
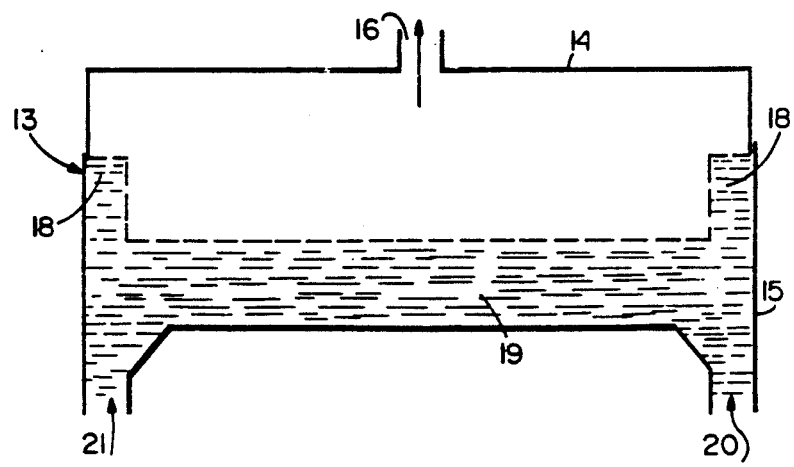
FIG. 2 is a diagrammatic representation of a two-part tool for use in the manufacture of a pre-form.
Figure 3:
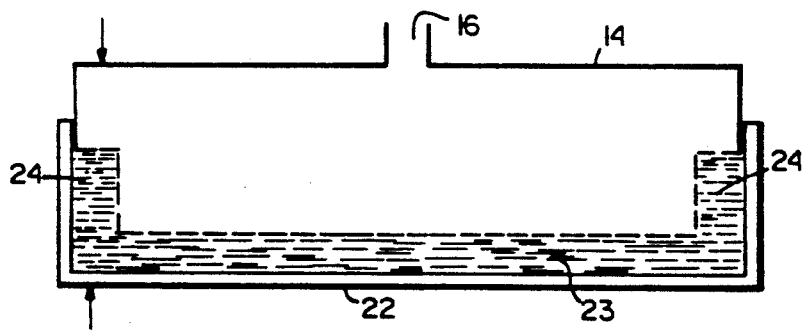
FIG. 3 is a diagrammatic representation showing the pre-form from FIG. 2 being pressed to final form.

In FIG. 3, the tool 14 of FIG. 2, still containing the pre-form, is placed in press tool 22 and the pre-form is pressed to the final desired shape 23, i.e. disc-like with a depending annular flange 24.

Figure 4:
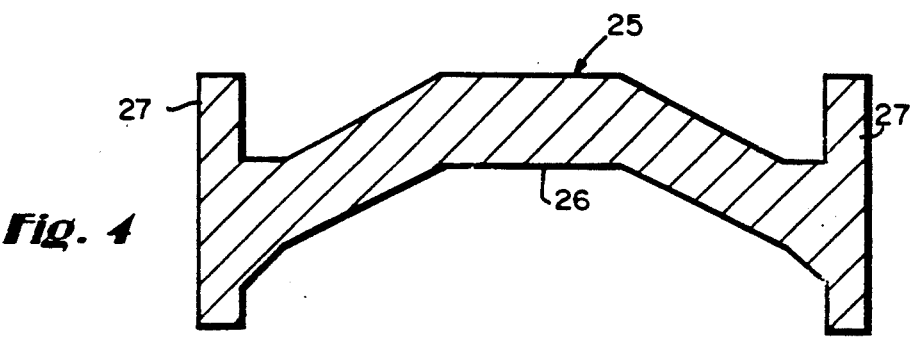
FIG. 4 is a cross-section through a further type of dished preform.

FIG. 4 is a cross-section through an alternative shape of pre-form 25. This is of generally dished or saucer-shape having a central recessed region 26 and an annular surrounding flange 27.

We claim:

1. A refractory support for a ceramic article while it is being fired, the support being a formed and fired mass having one or more surfaces sized and configured to give the required support to the ceramic article during firing, and comprising: bound ceramic fibers selected from the group consisting of aluminosilicate, alumina, or mixtures thereof; a refractory ground particulate filler and a refractory reactive binder; the filler being selected from the group consisting of alumina, aluminosilicates, or mixtures thereof, and being present in an amount of from 5 to 30% by weight of the fired product; and the binder containing both alumina and silica, both of colloidal particle size.

2. A refractory support according to claim 1 wherein the ground refractory particulate filler has a size of up to 75 microns diameter.

3. A refractory support according to claim 1 wherein the particle size of the refractory reactive binder of silica is from 1 to 150 nanometers.

4. A refractory support according to claim 1 wherein the particle size of the refractory reactive binder of alumina is from 1 to 250 nanometers.

5. A refractory support according to claim 1 wherein the proportions of alumina to silica in the refractory reactive binder are from 50:50 to 90:10 by weight.

6. A refractory support according to claim 5 wherein the proportions of alumina to silica in the refractory reactive binder are from 60:40 to 85:15 by weight.

7. A refractory support according to claim 1 wherein the refractory reactive binder is present in an amount of from 1 to 45% by weight of the fired product.

8. A refractory support according to claim 7 wherein the refractory reactive binder is present in an amount of from 20% to 30% by weight of the fired product.

9. A refractory support according to claim 1 wherein the ceramic fiber is present in an amount of from 50% to 80% by weight of the fired product.

10. A refractory support according to claim 1 wherein the ceramic fibers are of aluminosilicate blended with up to 50% by weight of high alumina fibers.

11. A refractory support according to claim 1 having a density from 0.2 to 1.2 g/cc.

12. A refractory support according to claim 1 having a depending annular flange.

13. A method of making a refractory support comprising the steps of:
 (i) forming an aqueous slurry, the aqueous slurry having liquid and solid portions, wherein the solid portion weighs up to 10% of the aqueous portion, the solid portion comprising: bound ceramic fibers selected from the group consisting of aluminosilicate and alumina fibers, or mixtures thereof; a colloidal reactive binder; and a ground particulate filler;
 (ii) withdrawing the liquid portion from the aqueous slurry so that the solid portion clings to a surface through which the liquid portion is withdrawn, forming a preform;
 (iii) removing the preform from the liquid portion;
 (iv) pressing the preform into a final form; and
 (v) firing the preform to form a finished article.

14. A method of making a refractory support according to claim 13 wherein step (ii) is practiced by vacuum forming.

15. A method of making a refractory support according to claim 14 wherein steps (ii) and (iv) are carried out at different stations.

16. A method of making a refractory support according to claim 13 wherein step (i) is practiced so that the solid portion weighs between 2 and 5% of the aqueous slurry.

17. A method of making a refractory support according to claim 13 wherein steps (i)-(iv) are practiced so that the preform has a solid content ranging between 30 and 80% of a pre-firing weight.

18. A method of making a refractory support according to claim 14 wherein said vacuum forming step is practiced utilizing a tool having a first part having apertures therein for withdrawal of the fluid portion therethrough, the said first part being sized and configured so as to correspond to the particular article intended to be supported and the first part with apertures causing the solid portion of the aqueous slurry to cling to the first part forming the preform.

19. A method of making a refractory support according to claim 18 wherein said vacuum forming step is further practiced utilizing a tool having a second part which provides a seal for the vacuum forming, and wherein step (iii) is practiced by removing the second part from the first part after the vacuum forming is completed.

20. A method of making a refractory support according to claim 13 comprising the further step, between steps (iii) and (v), of air drying the preform in a temperature range between 120° to 180° C.

21. A method of making a refractory support according to claim 13 wherein steps (i)-(v) are practiced so that the preform has a dish shape.

* * * * *